United States Patent [19]

Chareire

[11] Patent Number: 5,172,960
[45] Date of Patent: Dec. 22, 1992

[54] BRAKE CONTROL MINIMIZING THE NUMBER OF BRAKES ACTIVATED AND OPTIMIZING WEAR CONDITIONS

[75] Inventor: Jean-Louis Chareire, Levallois Perret, France

[73] Assignee: Aerospatiale Societe Nationale Industrielle, Paris, France

[21] Appl. No.: 832,465

[22] Filed: Feb. 7, 1992

[30] Foreign Application Priority Data

Feb. 12, 1991 [FR] France .................. 91 01582

[51] Int. Cl.$^5$ .................. B60T 13/66; B60T 8/62
[52] U.S. Cl. .................. 303/100; 303/8; 303/9.61; 303/15; 303/20; 303/95; 303/103; 303/111; 188/354; 364/426.02
[58] Field of Search .................. 303/7-8, 303/9.61, 9.62, 15-17, 20, 93, 95, 97, 98, 100, 103, 110, 111; 188/16, 354; 244/111; 364/426.02, 426.05, 426.01

[56] References Cited

U.S. PATENT DOCUMENTS

| | | | |
|---|---|---|---|
| 4,043,607 | 8/1977 | Signorelli et al. | 303/100 |
| 4,404,633 | 9/1983 | Goicoechea | 364/426.01 |
| 4,725,953 | 2/1988 | Rolland et al. | 364/426.02 |
| 4,804,237 | 2/1989 | Gee et al. | 303/7 |

FOREIGN PATENT DOCUMENTS

| | | |
|---|---|---|
| 0032853 | 7/1981 | European Pat. Off. |
| 0172071 | 2/1986 | European Pat. Off. |
| 0292687 | 11/1988 | European Pat. Off. |
| 2305775 | 10/1976 | France |

Primary Examiner—Douglas C. Butler
Assistant Examiner—Josie A. Ballato
Attorney, Agent, or Firm—Fisher, Christen & Sabol

[57] ABSTRACT

A braking system for a vehicle having wheels provided with braking devices, the system causing carbon brakes to wear less than do conventional systems. According to the invention, the system is provided with:

an adjustable member for voluntary actuation of braking and actuatable by the driver;

a transducer controlled by the adjustable member for voluntary actuation of braking, and delivering a first signal representative of the adjustment of the adjustable member as set by the driver to obtain desired deceleration of the vehicle;

a computer which controls the braking devices; and a first link connecting the transducer to the computer to transmit the first signal thereto;

wherein the computer includes:

first calculation device connected to the first link, receiving the first signal, and responding thereto by supplying a second signal representative of a minimum number D of braking devices that should be in the activated state to obtain the desired deceleration; and second calculation device which respond to the second signal to draw up a first list of D identities of braking devices that ought to be in the activated state, the computer using the first list to activate the D braking devices.

19 Claims, 3 Drawing Sheets

BRAKE CONTROL MINIMIZING THE NUMBER OF BRAKES ACTIVATED AND OPTIMIZING WEAR CONDITIONS

The present invention relates to a braking system for a wheeled vehicle provided with braking devices.

Particularly, but not exclusively, the invention makes it possible to use brakes having carbon linings or disks under conditions that are optimum for resistance to wear.

BACKGROUND OF THE INVENTION

In a conventional braking system, even when improved by the anti-skidding principle, actuation of the braking control by the driver brings all of the wheel brakes into play simultaneously, even if the desired deceleration is small.

It is known that carbon has better anti-wear performance than conventional friction materials for brakes that bring into play large amounts of energy or large quantities of power per unit area.

Unfortunately, it has been observed that if good solid lubrication conditions have not had time to become established, as happens with low-power braking bringing small quantities of energy into play, the relative performance of carbon is greatly reduced.

It has also been observed that the temperature of the carbon at the moment when braking takes place has an influence on the way its performance is degraded at low power or energy. It is desirable for its temperature to be greater than about 100° C. at the beginning of braking.

Finally, it is known that above 600° C. carbon performance is degraded by oxidation.

An object of the present invention is to mitigate these drawbacks, and the invention relates to a system that optimizes the use of multiple brakes so that they operate as often as possible under optimum temperature conditions, thereby avoiding any excessive wear. The said system also makes it possible to avoid excessive brake heating.

SUMMARY OF THE INVENTION

To this end, the present invention provides a system for controlling the braking devices of a vehicle driven by a driver and having a plurality of wheels provided with carbon disk brakes controlled by braking devices, said system being provided with:

an adjustable member for voluntary actuation of braking and actuatable by the driver;

a tranducer controlled by said adjustable member for voluntary actuation of braking, and delivering a first signal representative of the adjustment of said adjustable member as set by the driver to obtain desired deceleration of said vehicle;

a computer which controls said braking devices; and a first link connecting the transducer to said computer to transmit said first signal thereto;

the system being remarkable in that said computer includes:

first calculation means connected to said first link, receiving said first signal, and responding thereto by supplying a second signal representative of a minimum number D of braking devices that ought to be in the activated state to obtain the desired deceleration; and second calculation means which respond to said second signal to draw up a first list of D identities of braking devices that ought to be in the activated state, said computer using said first list to activate said D braking devices.

Thus, the invention enables the number of brakes brought into play when braking just a little, to be as small as possible, compatible with wheel grip, with braking just a little turning out to be by far the most frequent way that brakes are used. The number of brakes activated is limited to the deceleration requirements as indicated by the driver, thereby firstly using and thus wearing fewer of the brakes, and secondly making those brakes that are activated operate under better wear conditions. In addition, it can be arranged that the brakes which are brought into play have an initial temperature greater than 100° C., and also that they do not exceed the temperature of 600° C. during braking.

The said system is preferably applied to a vehicle provided on each wheel with a skid detector for detecting wheel skid on the ground, and advantageously said computer includes:

third calculation means connected to each of the outputs of the plurality of said skid detectors, and suitable for calculating the number of skids per wheel during a determined duration; and fourth calculation means receiving said skid numbers, and suitable for detecting the existence of at least N wheels, each presenting at least M skids, where N and M are integers not less than 1, and supplying a third signal indicating that such skids exist to said second calculation means, said second calculation means then increasing said number D of braking devices that ought to be in the activated state to raise it to a higher number Di, the size of said increase depending on the pair of values M and N.

The effect of including the number of skids makes it possible to cause additional braking devices to be activated only if a set proportion of the braked wheels present such a problem, thereby eliminating the effect on the braking system of multiple skids by a single wheel due to fleeting losses of grip. Further, by including both the number of skids by one wheel and the number of wheels that are skidding makes it possible to optimize the filtering which eliminates the effects of parasitic skids.

In addition, said fourth calculation means is advantageously suitable for detecting the simultaneous existence both of at least N1 wheels, each presenting at least M1 skids, where N1 and M1 are integers not less than 1, and of at least N2 wheels, each presenting M2 skids, where N2 and M2 are integers not less than 1, and supplying a fourth signal representative of the existence of such skids to said second calculation means, said second calculation means then increasing said number D of braking devices that ought to be in the activated state to raise it to a number D2j that is at least two units greater than D, the size of said increase depending on the pairs of values M1, N1 and M2, N2.

It is thus possible to detect a plurality of different skid configurations and to bring additional braking devices into play.

Similarly, the said system may include data input means with an adjustable control input suitable for being actuated by the driver to input data relating to the estimated value of the coefficient of friction between the wheels and the ground, and which transforms said data into a fifth signal representative of said estimated value of the coefficient of friction, said fifth signal being transmitted via a second link to said second calculation means which in turn modifies the number of braking device identities in said first list as a function of said fifth signal.

The number of braking devices that are activated initially can thus be optimized as a function of the expected coefficient of friction between the wheels and the ground, thereby making it possible to activate a minimum number of braking devices and also avoiding repeated skids at the beginning of braking.

Furthermore, said computer may include a table supplying said second calculation means with an ordered second list of identities of said braking devices, said second calculation means selecting the identities of braking devices that are to make up said first list by starting from a predetermined position in said second list, and always running through said second list in the same direction.

As a result, hot brakes are used more often and thus under good conditions.

Further, when said system includes a plurality of temperature sensors, each associated with a respective brake, its computer may include fifth calculation means receiving the signals from said temperature sensors and suitable for establishing a third list of braking device identities whose brakes are at temperatures lying in a range between a pre-established minimum temperature and a pre-established maximum temperature, and transmitting said third list to said second calculation means which gives priority to braking device identities in said third list when drawing up said first list.

In this way, those brakes that are in the optimum operating temperature range are used the most often.

Similarly, when said system includes a plurality of temperature sensors, each associated with a respective brake, its computer may include sixth calculation means receiving the data from said temperature sensors and suitable for drawing up an ordered fourth list of identities of braking devices whose brakes are at temperature lying between a pre-established minimum temperature Tmin and a pre-established maximum temperature Tmax, said fourth list being ordered as a function of the difference in temperature between the temperature of the brake under consideration and said minimum temperature Tmin, said sixth calculation means being connected to said second calculation means and supplying it with said fourth list, said second calculation means giving priority to the identities of braking devices in said fourth list when drawing up said first list.

This option makes it possible to heat those brakes that are at a temperature close to the minimum temperature, thereby keeping them above the minimum temperature, while also avoiding too frequent heating of brakes that are at a temperature close to the maximum temperature.

In addition, when said system includes a plurality of temperature sensors, each associated with a respective brake, its computer may include seventh calculation means receiving the data from said temperature sensors and suitable for establishing a fifth list of identities of braking devices whose brakes are at temperatures exceeding a pre-established safety maximum temperature TM, and transmitting said fifth list to said second calculation means which is suitable for eliminating identities that appear in said fifth list from said first list of identities of braking devices that ought to be in the activated state, and suitable for adding the same a number of identities of braking devices to said first list as the number of identities of braking devices that has just been removed therefrom.

This avoids damage due to excessive temperature.

In addition, when said system includes a plurality of temperature sensors, each associated with a respective brake, its computer may include eighth calculation means receiving data from said temperature sensors and suitable for detecting when each of the brakes is at a temperature below a rest temperature TR that determines a rest state during a thermal cycle of the brakes, and for transmitting a sixth signal representative of such detection to said second calculation means which responds to receiving such a sixth signal by changing the order in which the identities of the braking devices are entered into said first list.

This avoids some of the brakes wearing more than others.

Likewise, when said system includes a plurality of temperature sensors, each associated with a respective brake, said second calculation means may be suitable, on receiving said sixth signal, for modifying said order in which the identities of braking devices are entered into said first list in such a manner that over a large number of thermal cycles it ensures that each of said braking devices is used first about as often as each of the others.

This ensures that wear is statistically distributed equally over all of the brakes.

Furthermore, said system advantageously includes display means comprising a display and receiving from said second calculation means and via a third link the number of braking devices that ought to be in the activated state in the absence of skidding, which number is a function of said first and fifth signals and also of the number of braking devices actually in the activated state.

The driver can thus decide how hard to brake, and for subsequent braking can correct the data given to the computer relating to the estimated coefficient of friction, thereby making it possible to estimate more accurately the number of braking devices that need to be activated as a function of the coefficient of friction between the wheels and the ground.

In addition, when said system is applied to an aircraft having landing gear including a plurality of pairs of wheels, each disposed symmetrically relative to the other wheel of the pair about the plane of symmetry of the aircraft, said second calculation means may maintain both braking devices of the two wheels of a pair in an identical state, activated or not activated.

There is thus no danger of braking deflecting the heading of the aircraft.

Furthermore, when said system controls the brakes of a first vehicle which is coupled to at least one second vehicle having a plurality of wheels provided with carbon disk brakes controlled by respective braking devices, said second vehicle may include a computer controlling the braking devices of said second vehicle and comprising:

ninth calculation means similar to said first calculation means connected to said first link to receive said first signal and to respond thereto by supplying an eighth signal representative of a minimum number DA of braking devices of the second vehicle that ought to be in the activated state to obtain the desired deceleration; and tenth calculation means similar to said second calculation means and responsive to said eighth signal to draw up a sixth list including DA identities of braking devices of the second vehicle that ought to be in the activated state, said computer of the second vehicle using said sixth list for activating said DA braking devices of the second vehicle.

The braking system can thus be used in coordinated manner by a plurality of mechanically interconnected vehicles.

In addition, when each of the wheels of the first and second vehicles is provided with a respective skid detector, and when the computer of said first vehicle includes:

third calculation means connected to each of the outputs of the plurality of said skid detectors relating to the wheels of the first vehicle and suitable for calculating the number of skids of each wheel of said first vehicle during a determined duration; and fourth calculation means receiving said skid numbers and suitable for detecting the existence of at least N wheels each presenting at least M skids, where N and M are integers not less than 1, and providing a third signal representative of the existence of such skids to said second calculation means, said second calculation means then increasing said number D of braking devices that ought to be in the activated state to raise it to a higher number, the size of said increase depending on the pair of values M and N;

said computer of said second vehicle may comprise:

eleventh calculation means identical to said third calculation means and connected to each of the outputs of the plurality of said skid detectors relating to the wheels of the second vehicle and suitable for calculating the number of skids of each wheel of said second vehicle during said determined duration; and twelfth calculation means identical to said fourth calculation means and receiving said numbers of skids relating to the wheels of the second vehicle, and suitable for detecting the existence of at least N wheels each having at least M skids, and supplying said tenth calculation means to the computer of the second vehicle with a ninth signal representative of the existence of such skids of the wheels of the second vehicle, said tenth calculation means then increasing said number DA of braking devices of the second vehicle that ought to be in the activated state to raise it to a higher number DiA, the size of said increase depending on the pair of values M and N.

Thus skidding of any of the vehicles is detected and can be corrected.

Likewise, when the computer of said first vehicle includes fourth calculation means suitable for detecting the simultaneous existence both of at least N1 wheels, each presenting at least M1 skids, where N1 and M1 are integers not less than 1, and also of at least N2 wheels, each presenting M2 skids, where N2 and M2 are integers not less than 1, and supplying a fourth signal representative of the existence of such skids to said second calculation means, said second calculation means then increasing said number D of braking devices that ought to be in the activated state to raise it to a number D2j that is at least two units greater than D, the size of said increase depending on the pairs of values M1, N1 and M2, N2;

the computer of the second vehicle may include twelfth calculation means similar to the fourth calculation means and suitable for detecting the simultaneous existence both of at least N1 wheels, each presenting at least M1 skids, where N1 and M1 are integers not less than 1, and also at least N2 wheels, each presenting M2 skids, where N2 and M2 are integers not less than 1, and supplying a tenth signal representative of the existence of such skids to said tenth calculation means, said tenth calculation means then increasing said number DA of braking devices that ought to be in the activated state to raise it to a number D2jA which is at least two units greater than DA, the size of said increase depending on the pairs of values M1, N1 and M2, N2.

Further, when said system includes data input means having an adjustably controllable input suitable for actuation by the driver to input data relating to the estimated value of the coefficient of friction of the wheels on the ground, and which transforms said data into a fifth signal representative of said estimated value of the coefficient of friction, said fifth signal being transmitted by a second link to said second calculation means of the computer of the first vehicle which modifies the number of identities of braking devices of said first list of the first vehicle as a function of said fifth signal;

said second link may be connected to the tenth calculation means which modifies the number DA of identities of braking devices of said sixth list as a function of said fifth signal.

As a result, the computer of each vehicle can initially optimize the number of braking devices that are selected for activation.

Similarly, when each of the wheels of the first and second vehicles is provided with a temperature sensor and when the computer of said first vehicle includes fifth calculation means receiving the data from said temperature sensors of the wheels of the first vehicle and suitable for drawing up a third list of identities of braking devices of the first vehicle in which the brake is at a temperature lying between a pre-established minimum temperature Tmin and a pre-established maximum temperature Tmax, and for transmitting said third list to said second calculation means, which second calculation means gives priority to the identities of the braking devices in said third list when drawing up said first list of the first vehicle;

the computer of the second vehicle may include thirteenth calculation means similar to the fifth calculation means receiving the data from said temperature sensors of the wheels of the second vehicle and suitable for establishing an eighth list including the identities of the braking devices of the second vehicle whose brakes are at temperatures lying between a pre-established minimum temperature Tmin and a pre-established maximum temperature Tmax, and for transmitting said eighth list to said tenth calculation means, said tenth calculation means giving priority to the identities of braking devices in said eighth list when drawing up said sixth list.

The computer of each vehicle is thus suitable for managing best possible utilization of the various braking devices of said vehicle.

In addition, when the control cab includes display means comprising a display receiving both the number D of braking devices that ought to be in the activated state in the absence of skidding of the wheels of the first vehicle from said second calculation means of the computer of the first vehicle via a third link, which number is a function of said first and fifth signals, and also receiving the number Di or Fi of braking devices actually in the activated state;

said third link may be connected to the tenth calculation means; and said display means may be suitable for displaying both the number DA or FA of braking devices of said second vehicle that ought to be in the activated state in the absence of skidding of the wheels of the second vehicle, and also the number DiA or FiA of braking devices actually activated in said second vehicle.

The driver can thus have an overall view of the number of braking devices that are activated in each vehicle at the beginning of braking and the number that are actually activated during braking.

Furthermore, the above-defined system has the advantage of including:

remote control means suitable for receiving and using telemetry data and for emitting remote control commands; and a two-way bus connected to said remote control means and to said computer of each vehicle, each of said computers being suitable for emitting telemetry data over said bus and for receiving and using remote control commands thereover.

This centralization of telemetry data and of remote control data makes it possible to provide overall control of a sequence of vehicles that are mechanically interconnected.

BRIEF DESCRIPTION OF THE DRAWINGS

Embodiments of the invention are described by way of example with reference to the accompanying drawings, in which.

In the figures, identical references designate components that are identical or similar.

DETAILED DESCRIPTION

Figure 1:
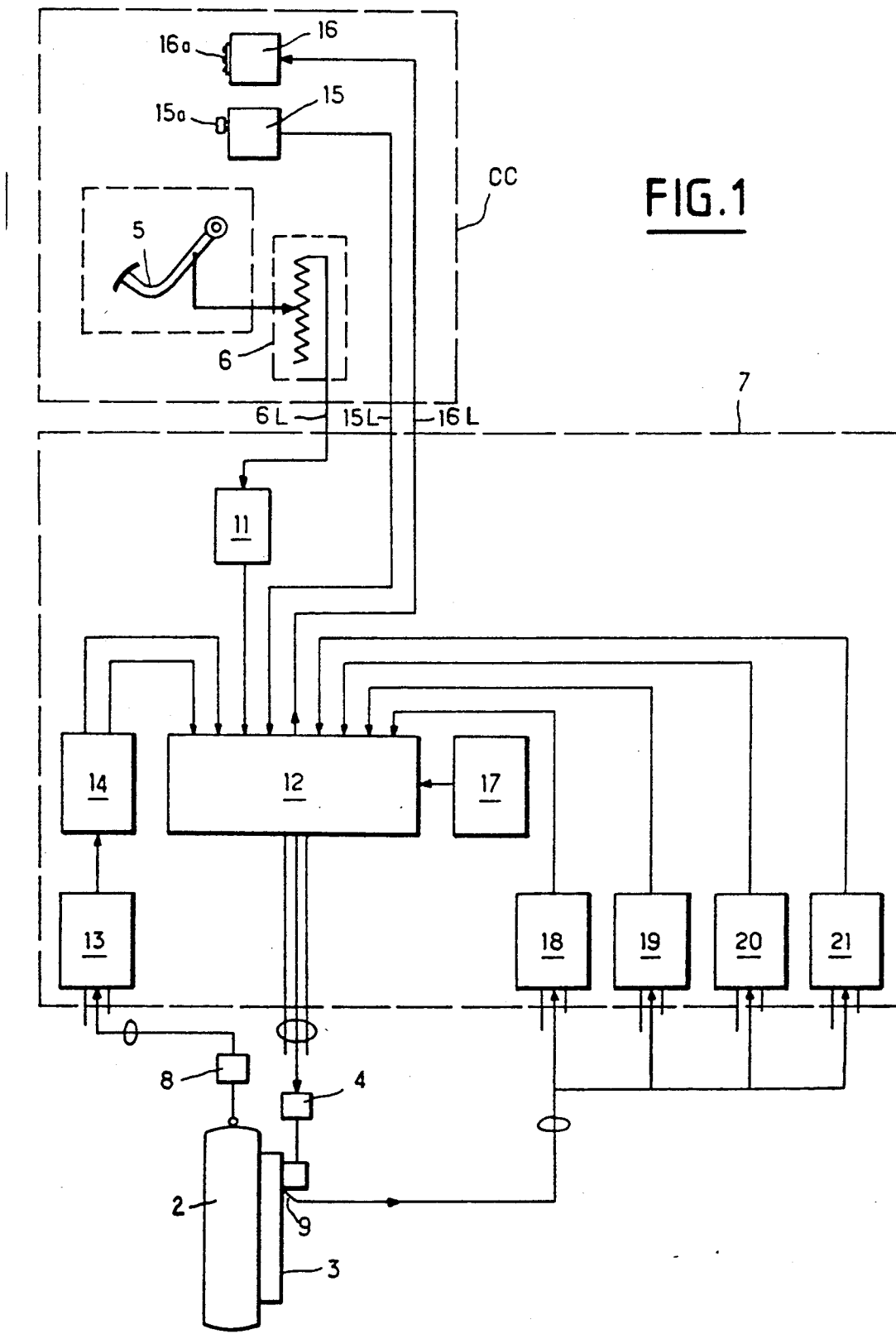
FIG. 1 is a block diagram showing how the system of the invention is organized.

The block diagram of FIG. 1 shows a single wheel 2 of a vehicle (not shown) provided with a brake 3 individually controlled by a braking device 4. The vehicle is driven by a driver situated in a driver's cab CC in which there is an adjustable member 5 for voluntarily actuating braking, which member controls a transducer 6 that provides a first signal representative of the adjustment applied by the driver to said adjustable member 5. This first signal is applied to a first link 6L connected to a computer 7 which individually controls the various braking devices 4. Each wheel 2 includes a skid detector 8 whose output is individually connected to the computer 7; similarly each brake 3 includes a temperature sensor 9 whose output is individually connected to the computer 7, and the functions thereof are explained below. Said first signal is applied in said computer 7 to first calculation means 11 which transform said first signal into a second signal representative of the theoretical minimum number C of braking devices 4 that should be in the activated state to satisfy the command from the adjustable member 5 specifying the deceleration desired for the vehicle, where C is a function, amongst other things, of the coefficient of friction between the wheels 2 and the ground, and of the fraction of the mass of the vehicle that is supported by each wheel.

The number C is transmitted to second calculation means 12 of the computer 7 and having a plurality of outputs, each connected to an individual one of the braking devices 4 and serving for transmitting commands to activate those ones of the braking devices 4 whose identities are in a first list established by said second calculation means 12, while the others remain unactivated. The second calculation means 12 rounds up the number C (which may include a fractional portion) to the immediately greater or equal integer D. Said second calculation means 12 has a second list including all of the braking device identities, and enabling the first list to be drawn up by selecting the identities of those braking devices 4 which ought to be in the activated state, and in an order that is explained below.

The skid detector 8 of each wheel 2 is individually connected to a third calculation means 13 of the computer 7 which is suitable for responding to the entire skid data reaching the computer via the skid detectors 8 of the various wheels 2 by the skid presented by each wheel 2 cyclically over a predetermined duration.

Before metering, this third calculation means 13 filters the skid information reaching it so as to eliminate skids that are of short duration or small amplitude. The metering may consist in counting the number of times each wheel 2 looses grip for a predetermined length of time, or it may consist in measuring the length of time during which the wheel 2 has been skidding, relative to said predetermined duration, i.e. a percentage representative of the accumulated skid time.

The skid data for each wheel 2 as calculated in this manner is transmitted to a fourth calculation means 14 of the computer for determining whether the observed skids require at least one additional braking device 4 to be brought into play. This fourth calculation means 14 is suitable for detecting the presence of at least M skids, on at least N wheels, where M and N are integers not less than 1, and assuming that it is the number of skids that is being counted. If metering provides the percentage of accumulated skid duration, then M represents such a percentage; to simplify the description below, M is assumed to be a number of skids.

In the event of at least M1 such skids being detected on at least N1 wheels, where M1 and N1 are possible values for M and N respectively, said fourth calculation means 14 transmits a third signal to the second calculation means 12. The second calculation means releases the brakes of the wheels that are skidding and adds an additional braking device identity to said first list of braking devices 4 that ought to be in the activated state, and outputs an activation command to said additional braking device 4. The process is repeated so long as skidding is taking place, with D rising to a value D1 equal to $D+1$, then to a value D2 equal to $D+2$, and so on up to Di equal to $D+i$, where i is a positive integer.

The said fourth calculation means 14 is also suitable for responding to the same input signals from the skid detectors 8 to detect whether there exist at least M1 skids on at least N1 wheels or whether there exist at least M2 skids, on at least N2 wheels, where M2 and N2 are possible values for M and N respectively.

If at least one of the above two cases should occur (skids defined by M1 and N1 or M2 and N2), said fourth calculation means 14 transmits a fourth signal to said second calculation means 12 which then adds at least two additional identities to said first list of identities of braking devices 4 that ought to be in the activated state. By an appropriate choices for M1, M2, N1, and N2, this process makes it possible to detect simultaneously a plurality of large skid configurations and to remedy them quickly by bringing at least two additional braking devices 4 into play. It is naturally possible to extrapolate to detecting even larger skids and to emitting other signals to the second calculation device 12 causing it to add at least three or more identities of braking devices 4 to said first list. In the example described, the effect of the third signal may be cancelled by the presence of the fourth signal, or it may be maintained, said third and fourth signals then each having the effect of causing one braking device identity to be added to the first list. This process is repeated so long as skidding continues, with the number of identities of braking devices 4 in the first list going from D to D21 which is equal to D+2, then to D22 which is equal to D+4, and up to D2j, which is equal to D+2j, where j is a positive integer.

In addition, in a preferred embodiment of the invention, the driver also has data input means 15 in the cab CC, including an input 15a enabling progressive adjustment to be performed and constituted, for example, by a slider, and having its output connected via a second link 15L to an input of said second calculation means 12. This data input means 15 enables the driver to enter data into said second calculation means 12 representative of the estimated value of the coefficient of friction between the wheels 2 and the ground. This value may be transmitted to said second calculation means 12 in the form of a fifth signal representative of the ratio of said estimated coefficient of friction divided by a pre-established mean coefficient of friction. Said second calculation means 12 then divides said number C by said ratio of coefficients of friction and obtains a theoretical number E possible including a fractional portion which is then rounded up to the next higher or equal integer F and which constitutes the number of braking devices 4 that ought to be in the activated state at the beginning of braking. Thus, if the estimated coefficient of friction is lower than the pre-established mean coefficient of friction, then said ratio is less than 1, and the number E is greater than C.

In the cab CC the driver also has display means 16 comprising a display 16a receiving the initial number F of braking devices 4 that ought to be in the activated state at the beginning of braking, which number is transmitted from the second calculation means 12 via a third link 16L, and also receiving a number Fi representing the number F plus a number that corresponds to the effects of said third and fourth signals. To simplify the description, the braking command delivered by the adjustable member 5 is assumed to be constant throughout braking. The driver can thus see whether significant skidding is taking place, indicating that the estimated coefficient of friction is too low. The driver can then correct the value input via the input means 15 for subsequent braking.

As mentioned above, the number E rounded up to F of braking devices 4 that should be in the activated state at the beginning of braking depends on the desired deceleration as requested by the means of the adjustable member 5 for voluntarily actuating braking and providing the first signal, and it also depends on the coefficient of friction set on the input means 15 that provides the fifth signal.

When at least one of these two signals, i.e. the first signal and the fifth signal, changes value during braking, the state of the braking devices 4 may change. Said second calculation means 12 cyclically scans both the state of the second signal which is representative of the state of the first signal, and the state of the fifth signal at the outputs of the first calculation means 11 and of the input means 15 respectively, and it calculates the above-mentioned number F. When the number F changes over time, it replaces the preceding number F and serves as the basis for determining the total number Fi of braking devices 4 to be activated, taking account of skidding. When the first signal from the adjustable member 5 for voluntarily actuating braking indicates that there should be no braking, then the total number Fi of braking devices 4 to be activated is forced to zero, regardless of the extent to which the wheels 2 are then skidding and the number of additional braking devices 4 that are activated.

In order to ensure that preferential use is made of brakes at a temperature lying in the range Tmin, close to 100° C., and a higher temperature Tmax, close to 600° C., above which a brake degrades more rapidly, each of the brakes 3 of the various wheels 2 is provided with its own one of said temperature sensors 9, with the outputs therefrom being individually connected to fifth calculation means 18 of the computer 7, which means receives data representative of the temperatures measured by the various temperature sensors 9 and establishes a third list on the basis thereof, which third list includes the identities of those brakes 3 whose temperatures lie between Tmin and Tmax. The identities of the brakes 3 in said third list are transmitted to said second calculation means 12 which selects identities of braking devices 4 for the first list initially from said third list, thereafter selecting identities from said second list taken from a table 17, should that be necessary.

A variant of the above selection procedure consists in using sixth calculation means 19 replacing said fifth calculation means 18, and supplying a fourth list to said second calculation means 12, which fourth list is an ordered list of the identities of braking devices whose brake temperatures lie in the range Tmin to Tmax, said identities being ordered as a function of the temperature difference between the temperature of the brake 3 under consideration and Tmin.

When establishing said first list, the second calculation means 12 selects the identities of braking devices 4 from said fourth list, beginning with the identities of brakes 3 whose temperatures are closest to Tmin. This gives priority to heating such brakes 3 and also to maintaining a maximum number of brakes 3 at a temperature lying in the optimum temperature range between Tmin and Tmax.

Further, to avoid using brakes 3 at high temperatures TM at which they could be damaged and at which they could possibly also damage their environment, the computer 7 may include seventh calculation means 20 which receives said data representative of the temperatures measured by the various temperature sensors 9.

The seventh calculation means 20 establishes a fifth list which it transmits to the second calculation means 12, which fifth list contains the identities of braking devices 4 whose associated brakes 3 are at temperatures exceeding TM. The second calculation means 12 then eliminates from the first list any identities of braking devices 4 that also occur in the fifth list, and it adds a number of identities of braking devices 4 equal to the number of identities of braking devices 4 that have just been eliminated, with the identities of the braking devices 4 added to the first list being selected as explained above. In the event of emergency braking being necessary, it is possible to have a command from the driver which authorizes activation of braking devices 4 whose brakes 3 are at temperatures exceeding TM. This command may be input by means of the slider 15a, for example, which for this purpose is moved to an extreme position, e.g. a position corresponding to an indication of the lowest possible coefficient of friction, which position may be visibly separated from the range of normal coefficient-of-friction positions so as to avoid error, thereby informing the computer 7 of the need to authorise activating braking devices 4 whose brakes 3 are at temperatures exceeding TM. The computer 7 can also be automatically authorized to use brakes 3 at a temperature exceeding TM in the event of the system skidding when all of the braking devices 4 are activated. The display means 16 then receives data from the computer 7 indicating the brakes are being used in this way so as to inform the driver.

In the description above, the number of braking devices 4 that is necessary and sufficient for obtaining the desired braking is determined by drawing up a preferred list of identities of braking devices 4 to be put into the first list, optionally by using calculation means 18, 19, and 20.

The order in which the various identities of braking devices 4 are selected for each list other than the first list and for use in drawing up said first list is explained in greater detail below.

In a first method of drawing up the first list, the computer 7 uses the braking devices 4 in a fixed order of preference, e.g. 4a, 4b, 4c, and 4d corresponding respectively to brakes 3a, 3b, 3c, and 3d associated respectively with wheels 2a, 2b, 2c, and 2d. On first braking, two braking devices 4a and 4b will be activated, for example. On second braking, they will be activated again in that order and their brakes 3a and 3b will heat up to above Tmin. During subsequent braking, the same braking devices 4a and 4b will continue to be used in that order, optionally together with other braking devices should that be necessary. Thus, because of their thermal inertia, the brakes 3a and 3b will remain above Tmin in the event of repeated braking, and they will therefore be used under optimum conditions during subsequent braking. In addition, the other braking devices 4c and 4d will not be used in general and will therefore not wear.

In order to distribute wear over the various brakes 3, the order of preference for using the brakes 3 can be modified during the subsequent thermal cycle, i.e. after all of the brakes 3 have returned to a temperature TR less than about Tmin and defining a rest state for the brakes. This rest state in a thermal cycle is determined by the computer 7 either by direct temperature measurement using the temperature sensors 9, or else by modelling the temperature of the brakes 3 as a function of the structure of the brake 3 and of its activation.

To detect the rest state of the brakes 3 in a thermal cycle directly, the computer 7 may include eighth calculation means 21 receiving the individual data from each of the various temperature sensors 9 and delivering a sixth signal to the second calculation means 12 whenever all of the brakes 3 are at a temperature below the predetermined rest temperature TR.

This change in order of preference may also be controlled by a time base, contained within the computer 7 and which controls such a change cyclically, e.g. once a day, said change being delayed until all of the brakes 3 have cooled to a temperature below TR should the braking thermal cycle be in the active state (i.e. any state other than the rest state, which means that at least one of the brakes 3 is at a temperature greater than TR). The change may be constituted by a circular permutation, with the computer 7 including a pointer that specifies in the second list of identities of braking devices 4 the identity of the first braking device 4 that may be activated, the identity of the next braking device 4 that may be activated then being the following identity in said second list, for example, or it may be the identity at the other end of said list if starting from the end of the list, i.e. from a position in which there is no following identity in said second list. It is equally possible to perform a random or a pseudorandom selection so that the various brakes 3 end up with substantially the same amount of use over their lifetime.

When another list of identities of braking devices 4 is available, such as the third, fourth, or fifth lists, the order of the above selections is modified.

Thus, when there exists a third list, then the order in which the first list is drawn up is itself established as described above, but marking those identities of braking devices 4 that do not appear in said third list at the end of said first list in the order in which they come.

If the fourth list exists, then in accordance with requirements this list (which is ordered) is added in its order to the beginning of the first list; with the identities of other braking devices 4 not yet appearing in said first list subsequently being added thereto in the selection order established for the second list.

The effect of the fifth list is to remove identities of braking devices 4 from the first list if they appear in the fifth list, unless contrary instructions are given by the driver.

In another selection method, within a given thermal cycle in the active state, the order in which the various braking devices 4 are selected may be modified in the following manner. The brakes 3 at a temperature lying in the range Tmin to Tmax are selected as a matter of preference. For example, the second calculation means 12 uses the above-defined order of preference when adding to the end of the first list any brakes 3 at a temperature lying outside said range. Thus, priority is given to brakes 3 at the optimum operating temperature. If the number of such brakes 3 is insufficient, then the brakes 3 at a temperature lying below said range are used, or else those that lie above said range are used, providing they do not exceed a temperature TM which is greater than or equal to Tmax.

In a variant, and still within the same thermal cycle, it is possible to give preference in selecting those brakes 3 whose temperatures within the optimum range are close to its bottom limit Tmin. In this way, any brakes 3 at a temperature which is likely to drop below Tmin are reheated first, thereby moving their temperatures away from said bottom limit Tmin and thus maintaining a maximum number of brakes 3 in said temperature range.

Further, still within a single thermal cycle, the computer 7 may decide to deactivate braking devices 4 whose brakes 3 are at a temperature exceeding the temperature TM, as mentioned above, having their identities in the fifth list. This process is asynchronous relative to the sequential processes described above since a temperature exceeding TM may be detected at any instant during braking. The second calculation means 12 then causes any braking device 4 whose brake 3 is at a temperature greater than TM to be deactivated by removing its identity from the first list, and it activates an additional braking device 4 selected using the method of selection then in use, by writing its identity in the first list, as described above.

The presence of a non-empty fifth list naturally prohibits the writing of the identities of the braking devices 4 in said fifth list when subsequently making up the first list. In the event of the need for emergency braking, the command from the driver that authorizes activation of brakes at a temperature exceeding TM then cancels such prohibition.

Figure 2:
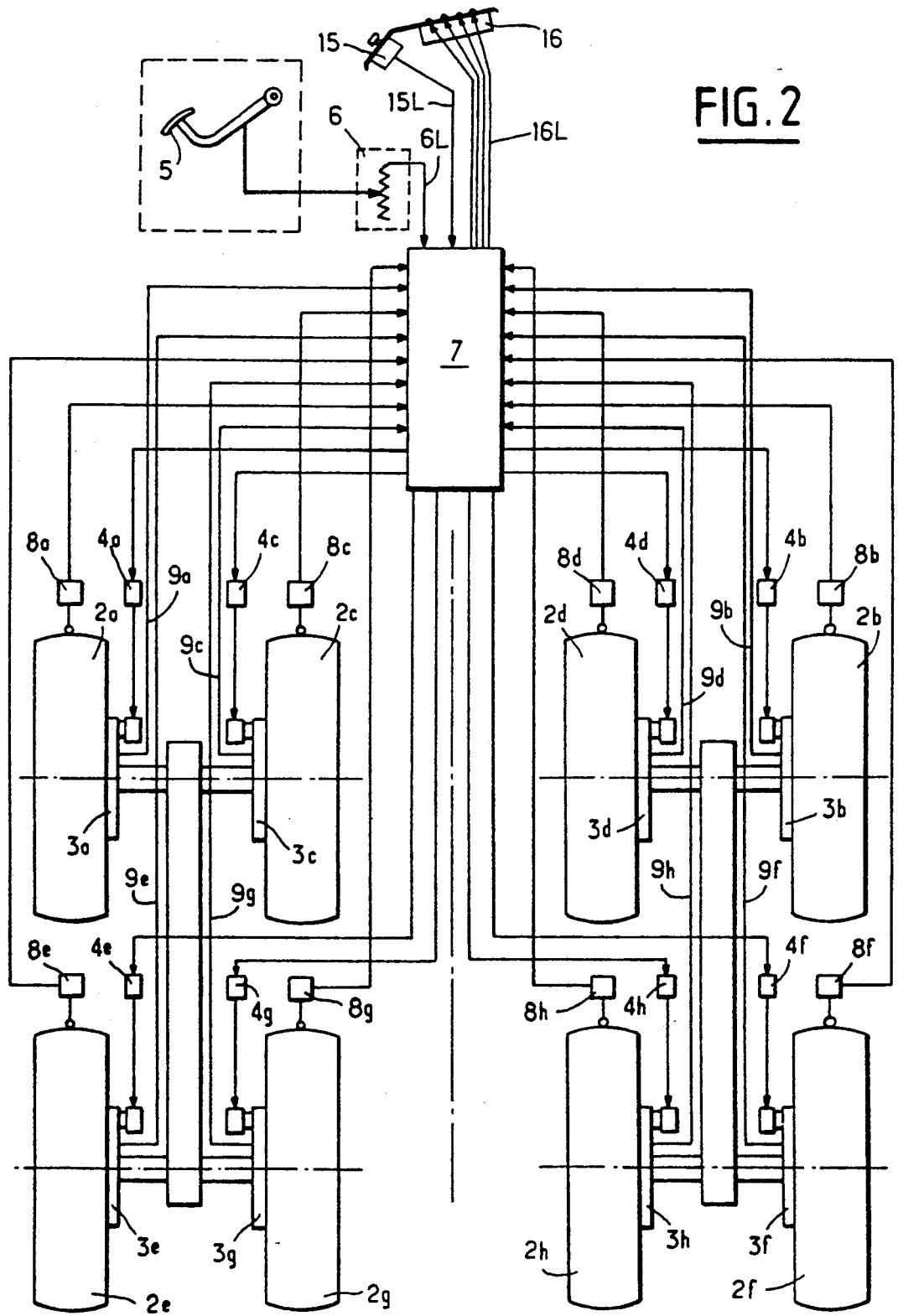
FIG. 2 is a diagram showing the landing gear of an aircraft fitted to implement the braking system of the invention.

FIG. 2 shows an application of the present invention to an aircraft. The aircraft includes landing gear having bogeys with wheels 2 referenced 2a to 2h. Together these wheels 2 are disposed symmetrically about the plane of symmetry of the aircraft. Each wheel 2 has a brake 3 with a respective reference 3a to 3h, under the control of a braking device 4 with a respective reference 4a to 4h, and a skid detector 8 respectively referenced 8a to 8h, and a temperature sensor 9 respectively referenced 9a to 9h. The computer 7 controls the braking devices 4 and it receives data from the skid detectors 8 and the temperature sensors 9.

The driver (i.e. the pilot) has an adjustable member 5 for voluntarily actuating braking coupled to a transducer 6 whose output is connected to the first calculation means 11 of the computer 7. Data input means 15 are also available to the pilot for specifying the estimated coefficient of friction between the wheels 2 and the ground. Display means 16 under the control of the second calculation means 12 inform the pilot of the number D of braking devices 4 that are initially activated on braking, together with the number Fi of braking devices 4 that are activated in fact.

In order to retain braking balance with wheels 2 that are symmetrically disposed in pairs about the plane of symmetry of the aircraft, the two braking devices such as 4a and 4b for each such pair of wheels such as 2a and 2b are controlled identically. This may be achieved by having a single braking control per pair of wheels 2a and 2b, e.g. a hydraulic circuit that is common to both braking devices 4 of such a pair of wheels 2a and 2b. It is also possible to retain physical independence between said two braking devices 4a and 4b of a pair 2a and 2b, while ensuring that the commands applied to said braking devices 4 are similar. This takes place in the first list by ensuring, for example, that whenever the identity of a braking device 4 selected as explained above is written therein, then the identity of the braking device 4 belonging to the other wheel 2 in the pair is always written therein as well, after which said first list continues to be drawn up in alternating manner, adding one identity as described above and then immediately adding the identity of the braking device 4 of the other wheel in the pair.

If the fifth list exists, i.e. the list of brakes 3 at too high a temperature, then the second calculation means 12 takes account of the highest temperature of each pair of wheels 2, and thus eliminates from the first list all pairs of identities of braking devices 4 having at least one of their identities appearing in said fifth list.

One way of establishing the identity of a braking device 4 starting from the identity of the associated braking device 4 may consist in addressing a read-only memory that provides said identity, or may be achieved merely by associating an identity represented by an even number with an identity represented by the immediately smaller odd number. This makes it possible to consult data relating to each wheel 2 quickly and to draw up the first list as a function of the data relating to the two wheels 2 in each pair.

Figure 3:
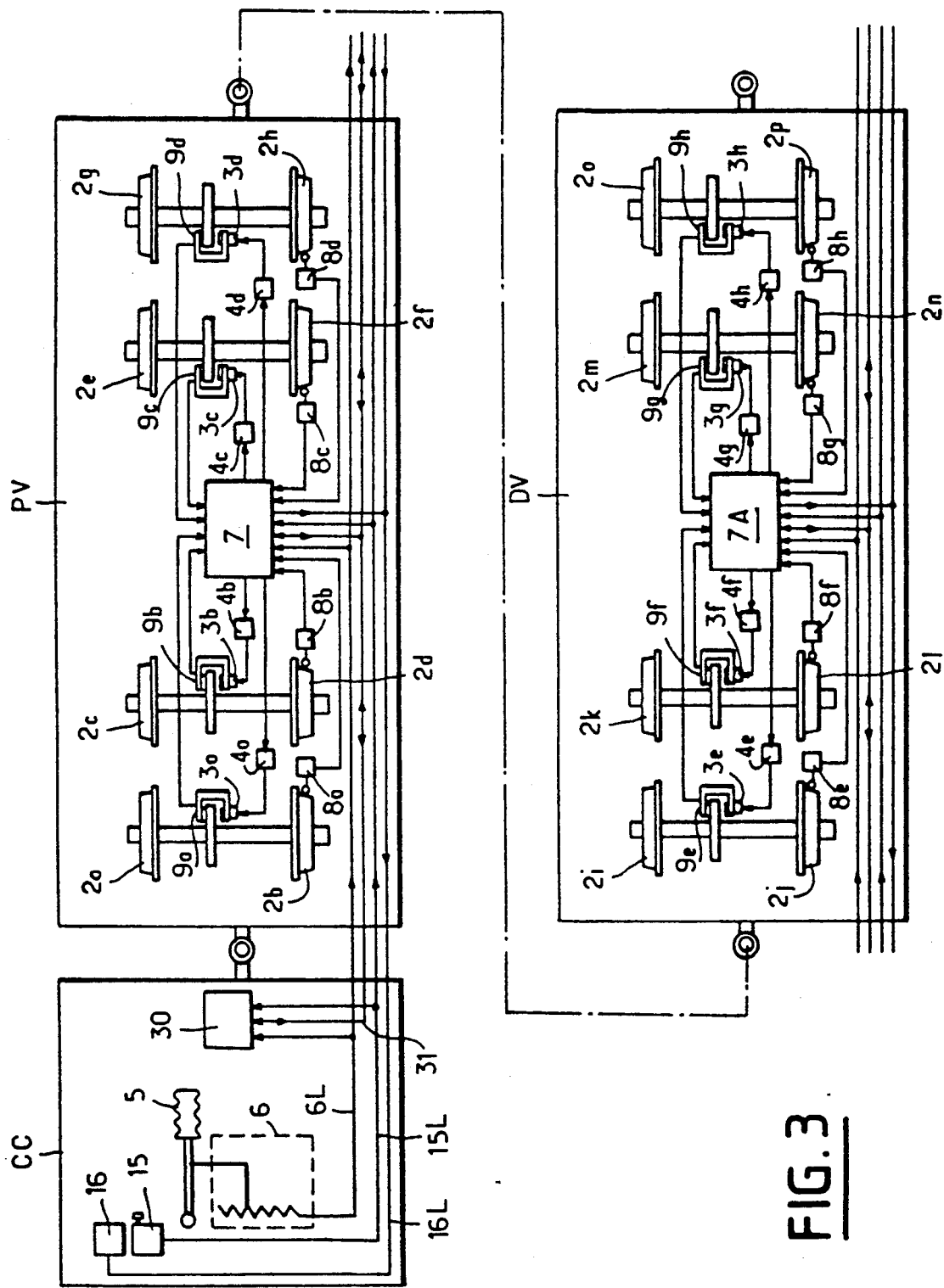
FIG. 3 is a diagram showing a sequence of vehicles constituting a train and including a train driver's cab.

FIG. 3 shows an application of the present invention to a sequence of vehicles comprising a train. The driver's cabin CC situated in one of the vehicles includes remote control means 30, an adjustable member 5 for voluntarily actuating braking and controlling a transducer 6, input means 15 for inputting the estimated value of the coefficient of friction of the wheels 2 on the ground (i.e. rails), and display means 16 for informing the driver of the number of braking devices 4 that are activated at the beginning of braking and the number of devices actually being actuated, for each vehicle. The sequence of vehicles comprises a first vehicle (PV) and a second vehicle (DV), each having a computer 7 as described, and respectively referenced 7 and 7A, each being capable of including respective calculation means similar to the calculation means 11 to 21 described above and respectively referred to as the first to eighth calculation means and the ninth to sixteenth calculation means. The computer 7A uses seventh to twelfth signals respectively corresponding to the first to sixth signals of the computer 7. Similarly, the computer 7A generates sixth to tenth tables respectively corresponding to the first to fifth tables. It defines numbers CA, DA, D1A, D2A, DiA, D21A, D22A, D2jA, EA, FA, FiA, which correspond respectively to the numbers C, D, D1, D2, Di, D21, D22, D2j, E, F, and Fi. The computers 7 and 7A control the braking of wheels 2 respectively referenced 2a to 2h and 2i to 2p by means of brakes 3 respectively referenced 3a to 3d and 3e to 3h controlled by individual braking devices 4 respectively referenced 4a to 4d and 4e to 4h, with one of the two wheels 2 on each axle including a skid detector 8 respectively referenced 8a to 8d and 8e to 8h, and an associated brake temperature sensor 9, respectively referenced 9a to 9d and 9e to 9h, which sensors and detectors are connected to the corresponding computer 7 or 7A, as described above.

The transducer 6 is connected by the first link 6L to each of the corresponding inputs of the first and ninth calculation means 11 of respective computers 7 and 7A, and also to an input of the remote control means 30. The output of the data input means 15 is connected to the corresponding inputs of the second and tenth calculation means of the same type as the calculation means 12, in the computers 7 and 7A respectively, and also to an input of the remote control means 30 via a second link 15L. The display means 16 has inputs respectively connected to corresponding outputs of the second and tenth type 12 calculation means of the computers 7 and 7A respectively via a third link 16L which is represented symbolically by a single line.

In addition, a two-way data transmission bus 31 connects said remove control means 30 to each of the computers 7 and 7A.

During braking, each computer 7 and 7A of the vehicle determines the numbers D, DA and Fi, FiA of braking devices 4 in the corresponding vehicle that are to be activated as a function of the desired deceleration, the estimated coefficient of friction between the wheel 2 and the ground, the measured skid, and the temperature of the brakes 3, where DA and FiA apply to the computer 7A and correspond respectively to D and Fi. Thus, the number of braking devices 4 may differ from one vehicle to another. Furthermore, each vehicle computer 7, 7A may inform the remote control means 30 of the state of its braking devices 4 such as whether or not they are activated and their temperatures, by sending telemetry data thereto. The remote control means 30 is then in a position to send remote control commands to all of the computers 7, 7A for the purpose of increasing or decreasing the number of braking devices 4 activated in each vehicle. The said transmission of telemetry data and of remote control data takes place over the said two-way bus 31.

The remote control means 30 thus serves to distribute braking force better between cars, thereby optimizing the use of the various brakes 3.

The two applications given above by way of explanatory and non-limiting example may be varied. Thus, the transmission of data between the various displays, inputs, sensors, detectors, and the computer 7 of a vehicle, which are described above as using individual links, may in fact be multiplexed over a bus. The use of such a variant, or of other variants, does not go beyond the ambit and the spirit of the present invention.

I claim:

1. A system for controlling the braking devices of a vehicle driven by a driver and having a plurality of wheels provided with carbon disk brakes controlled by braking devices, said system being provided with:

an adjustable member for voluntary actuation of braking and actuatable by the driver;

a transducer controlled by said adjustable member for voluntary actuation of braking, and delivering a first signal representative of the adjustment of said adjustable member as set by the driver to obtain desired deceleration of said vehicle;

a computer which controls said braking devices; and a first link connecting the transducer to said computer to transmit said first signal thereto;

said computer includes:

first calculation means connected to said first link, receiving said first signal, and responding thereto by supplying a second signal representative of a minimum number D of braking devices that ought to be in the activated state to obtain the desired deceleration; and second calculation means which respond to said second signal to draw up a first list of D identities of braking devices that ought to be in the activated state, said computer using said first list to activate said D braking devices.

2. A system according to claim 1, for a vehicle provided on each wheel with a skid detector for detecting wheel skid on the ground, wherein said computer includes:

third calculation means connected to each of the outputs of the plurality of said skid detectors, and suitable for calculating the number of skids per wheel during a determined duration; and fourth calculation means receiving said skid numbers, and suitable for detecting the existing of at least N wheels, each presenting at least M skids, where N and M are integers not less than 1, and supplying a third signal indicating that such skids exist to said second calculation means, said second calculation means then increasing said number D of braking devices that ought to be in the activated state to raise it to a higher number Di, the size of said increase depending on the pair of values M and N.

3. A system according to claim 2, wherein said fourth calculation means is suitable for detecting the simultaneous existence both of at least N1 wheels, each presenting at least M1 skids, where N1 and M1 are integers not less than 1, and of at least N2 wheels each presenting M2 skids, where N2 and M2 are integers not less than 1, and supplying a fourth signal representative of the existence of such skids to said second calculation means, said second calculation means then increasing said number D of braking devices that ought to be in the activated state to raise it to a number D2j that is at least two units greater than D, the size of said increase depending on the pairs of values M1, N1 and M2, N2.

4. A system according to claim 1, including data input means having an adjustably controllable input suitable for actuation by the driver to enter data relating to the estimated value of the coefficient of friction between the wheels and the ground, the input means transforming said data into a fifth signal representative of said estimated value of the coefficient of friction, said fifth value being transmitted via a second link to said second calculation means which in turn changes, as a function of said fifth signal, the number D or Di of identities of braking devices in said first list to a number F or Fi, where F and Fi are positive integers.

5. A system according to claim 1, wherein said computer includes a table supplying said second calculation means with an ordered second list of identities of said braking devices, said second calculation means selecting the identities of braking devices that are to make up said first list by starting from a predetermined position in said second list, and always running through said second list in the same direction.

6. A system according to claim 1, including a plurality of temperature sensors each associated with a respective brake, wherein the computer includes fifth calculation means receiving data from said temperature sensors and suitable for drawing up a third list of identities of braking devices whose brakes are at temperatures lying in a range between a pre-established minimum temperature value Tmin, and a pre-established maximum temperature value Tmax, and transmitting said third list to said second calculation means which gives priority to the identities of braking devices in said third list when drawing up said first list.

7. A system according to claim 1, including a plurality of temperature sensors each associated with a respective brake, wherein the computer includes sixth calculation means receiving the data from said temperature sensors and suitable for drawing up an ordered fourth list of identities of braking devices whose brakes are at temperatures lying between a pre-established minimum temperature Tmin and a pre-established maximum temperature Tmax, said fourth list being ordered as a function of the difference in temperature between the temperature of the brake under consideration and said minimum temperature Tmin, said sixth calculation means being connected to said second calculation means and supplying it with said fourth list, said second calculation means giving priority to the identities of braking devices in said fourth list when drawing up said first list.

8. A system according to claim 1, including a plurality of temperature sensors each associated with a respective brake, wherein the computer includes seventh calculation means receiving the data from said temperature sensors and suitable for establishing a fifth list of identities of braking devices whose brakes are at temperatures exceeding a pre-established safety maximum temperature TM, and transmitting said fifth list to said second calculation means which is suitable for eliminating identities that appear in said fifth list from said first list of identities of braking devices that ought to be in the activated state, and suitable for adding the same number of identities of braking devices to said first list as the number of identities of braking devices that has just been removed therefrom.

9. A system according to claim 1, including a plurality of temperature sensors each associated with a respective brake, wherein the computer includes eighth calculation means receiving data from said temperature sensors and suitable for detecting when each of the brakes is at a temperature below a rest temperature TR that determines a rest state during a thermal cycle of the brakes, and for transmitting a sixth signal representative of such detection to said second calculation means which responds to receiving such a sixth signal by changing the order in which the identities of the braking devices are entered into said first list.

10. A system according to claim 9, wherein said second calculation means is suitable, on receiving said sixth signal, for modifying said order in which the identities of braking devices are entered into said first list in such a manner that over a large number of thermal cycles, it ensures that each of said braking devices is used first about as often as each of the others.

11. A system according to claim 1, including display means including a display and receiving the number D or F of braking devices that ought to be in the activated state in the absence of skidding from said second calculation means via a third link, which number is a function of said first and fifth signals and also of the number Di or Fi of braking devices actually in the activated state.

12. A system according to claim 1, applied to an aircraft having landing gear including a plurality of pairs of wheels, the wheels in each pair being disposed symmetrically relative to each other about the plane of symmetry of the aircraft, wherein said second calculation means maintains both braking devices of the two wheels of each pair in an identical state, activated or not activated.

13. A system according to claim 1, controlling the brakes of a first vehicle which is coupled to at least one second vehicle having a plurality of wheels provided with carbon disk brakes controlled by respective braking devices, wherein said second vehicle includes a computer controlling the braking devices of said second vehicle and comprising:
  ninth calculation means similar to said first calculation means connected to said first link to receive said first signal and to respond thereto by supplying an eighth signal representative of a minimum number DA of braking devices of the second vehicle that ought to be in the activated state to obtain the desired deceleration; and
  tenth calculation means similar to said second calculation means and responsive to said eighth signal to draw up a sixth list including DA identities of braking devices of the second vehicle that ought to be in the activated state, said computer of the second vehicle using said sixth list for activating said DA braking devices of the second vehicle.

14. A system according to claim 13, in which each of the wheels of the first and second vehicles is provided with a respective skid detector, and in which the computer of said first vehicle includes:
  third calculation means connected to each of the outputs of the plurality of said skid detectors relating to the wheels of the first vehicle and suitable for calculating the number of skids of each wheel of said first vehicle during a determined duration; and
  fourth calculation means receiving said skid numbers and suitable for detecting the existence of at least N wheels, each presenting at least M skids, where N and M are integers not less than 1, and providing a third signal representative of the existence of such skids to said second calculation means, said second calculation means then increasing said number D of braking devices that ought to be in the activated state to raise it to a higher number, the size of said increase depending on the pair of values M and N;
  wherein said computer of said second vehicle comprises:
  eleventh calculation means identical to said third calculation means and connected to each of the outputs of the plurality of said skid detectors relating to the wheels of the second vehicle and suitable for calculating the number of skids of each wheel of said second vehicle during said determined duration; and
  twelfth calculation means identical to said fourth calculation means and receiving said numbers of skids relating to the wheels of the second vehicle, and suitable for detecting the existence of at least N wheels each having at least M skids, and supplying said tenth calculation means of the computer of the second vehicle with a ninth signal representative of the existence of such skids of the wheels of the second vehicle, said tenth calculation means then increasing said number DA of braking devices of the second vehicle that ought to be in the activated state to raise it to a higher number DiA, the size of said increase depending on the pair of values M and N.

15. A system according to claim 14, in which the computer of said first vehicle includes fourth calculation means suitable for detecting the simultaneous existence both of at least N1 wheels each presenting at least M1 skids, where N1 and M1 are integers not less than 1, and also of at least N2 wheels each presenting M2 skids, where N2 and M2 are integers not less than 1, and supplying a fourth signal representative of the existence of such skids to said second calculation means, said second calculation means then increasing said number D of braking devices that ought to be in the activated state to raise it to a number D2f that is at least two units greater than D, the size of said increase depending on the pairs of values M1, N1 and M2, N2;
  wherein the computer of the second vehicle includes twelfth calculation means similar to the fourth calculation means and suitable for detecting the simultaneous existence both of at least N1 wheels each presenting at least M1 skids, where N1 and M1 are integers not less than 1, and also of at least N2 wheels each presenting M2 skids, where N2 and M2 are integers not less than 1, and supplying a tenth signal representative of the existence of such skids to said tenth calculation means, said tenth calculation means then increasing said number DA of braking devices that ought to be in the activated state to raise it to a number D2jA which is at least two units greater than DA, the size of said increase depending on the pairs of values M1, N1 and M2, N2.

16. A system according to claim 13, including data input means having an adjustably controllable input suitable for actuation by the driver to input data relating to the estimated value of the coefficient of friction of the wheels on the ground, and which transforms said data into a fifth signal representative of said estimated value of the coefficient of friction, said fifth signal being transmitted by a second link to said second calculation means of the computer of the first vehicle which modifies the number of identities of braking devices of said first list of the first vehicle as a function of said fifth signal;

wherein said second link is connected to the tenth calculation means which modifies the number DA of identities of braking devices of said sixth list as a function of said fifth signal.

17. A system according to claim 13, in which each of the wheels of the first and second vehicles is provided with a temperature sensor and in which the computer of said first vehicle includes fifth calculation means receiving the data from said temperature sensors of the wheels of the first vehicle and suitable for drawing up a third list of identities of braking devices of the first vehicle in which the brake is at a temperature lying between a pre-established minimum temperature Tmin and a pre-established maximum temperature Tmax, and for transmitting said third list to said second calculation means, which second calculation means gives priority to the identities of the braking devices in said third list when drawing up said first list of the first vehicle;

wherein the computer of the second vehicle includes thirteenth calculation means similar to the fifth calculation means receiving the data from said temperature sensors of the wheels of the second vehicle and suitable for establishing an eighth list including the identities of the braking devices of the second vehicle whose brakes are at temperatures lying between a pre-established minimum temperature Tmin and a pre-established maximum temperature Tmax, and for transmitting said eighth list to said tenth calculation means, said tenth calculation means giving priority to the identities of braking devices in said eighth list when drawing up said sixth list.

18. A system according to claim 13, including display means comprising a display receiving both the number D of braking devices that ought to be in the activated state in the absence of skidding of the wheels of the first vehicle from said second calculation means of the computer of the first vehicle via a third link, which number is a function of said first and fifth signals, and also receiving the number Di or Fi of braking devices actually in the activated state;

wherein:

said third link is connected to the tenth calculation means; and said display means is suitable for displaying both the number DA or FA of braking devices of said second vehicle that ought to be in the activated state in the absence of skidding of the wheels of the second vehicle, and also the number DiA or FiA of braking devices actually activated in said second vehicle.

19. A system according to claim 13, including:

remote control means suitable for receiving and using telemetry data and for emitting remote control commands; and a two-way bus connected to said remote control means and to said computer of each vehicle, each of said computers being suitable for emitting telemetry data over said bus and for receiving and using remote control commands thereover.

* * * * *